INVENTOR.
Carl A. Flood
BY
Roberts, Cushman & Grover
ATT'YS

March 5, 1963 C. A. FLOOD 3,079,979
APPARATUS FOR LABELING ARTICLES
Filed Nov. 18, 1959 4 Sheets-Sheet 2

INVENTOR.
Carl A. Flood
BY
Roberts, Cushman + Grover
ATT'YS

March 5, 1963 C. A. FLOOD 3,079,979
APPARATUS FOR LABELING ARTICLES
Filed Nov. 18, 1959 4 Sheets-Sheet 3
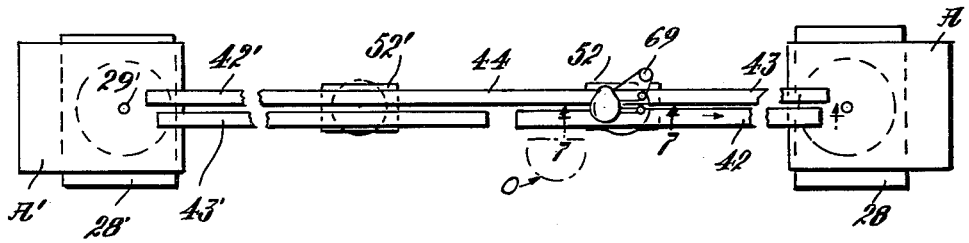
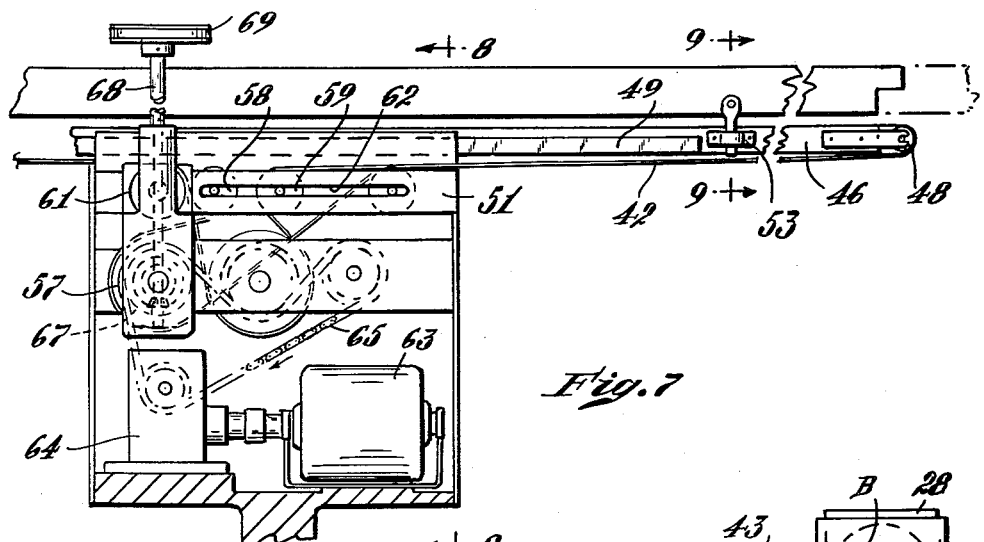
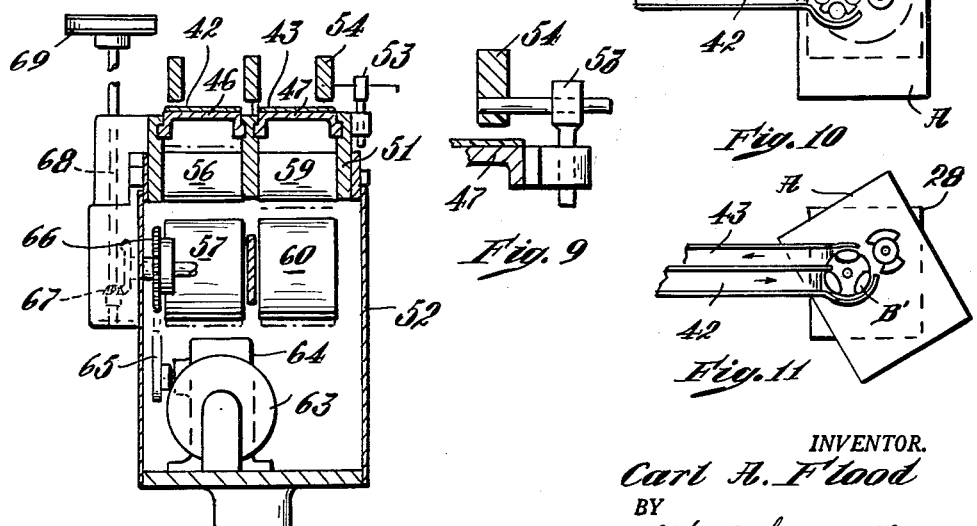
INVENTOR.
Carl A. Flood
BY
Roberts, Cushman & Grover
ATT'YS INVENTOR.
Carl A. Flood
BY
Roberts, Cushman & Grover
ATT'YS United States Patent Office 3,079,979
Patented Mar. 5, 1963

3,079,979
APPARATUS FOR LABELING ARTICLES
Carl A. Flood, Framingham, Mass., assignor to Dennison Manufacturing Company, Framingham, Mass., a corporation of Massachusetts
Filed Nov. 18, 1959, Ser. No. 853,831
5 Claims. (Cl. 156—542)

This invention relates to apparatus for applying indicia to articles such as bottles, and more particularly to apparatus for making two applications of indicia on different sides of each article.

Objects of the invention are to provide apparatus which is simple and economical to construct and operate, which is readily adjustable to articles of different sizes and shapes, and which is durable and reliable in use.

According to the present invention the apparatus comprises two label-applying mechanisms and a loading station, together with means for conveying articles from the loading station to one label-applying mechanism, thence to the other label-applying mechanism and thence to a delivery point, and means to turn the articles in transit from one label-applying mechanism to the other. Preferably the loading station is intermediate the two label-applying mechanisms and the articles are conveyed along a straight line from the first label-applying mechanism to the second label-applying past the loading station and thence back to a delivery point adjacent the loading station. The apparatus should also include means for rotating or otherwise shifting each label-applying mechanism relative to the paths along which the articles are conveyed to and from the label-applying mechanisms so as to accommodate articles of different kinds.

Figures 1, 2:
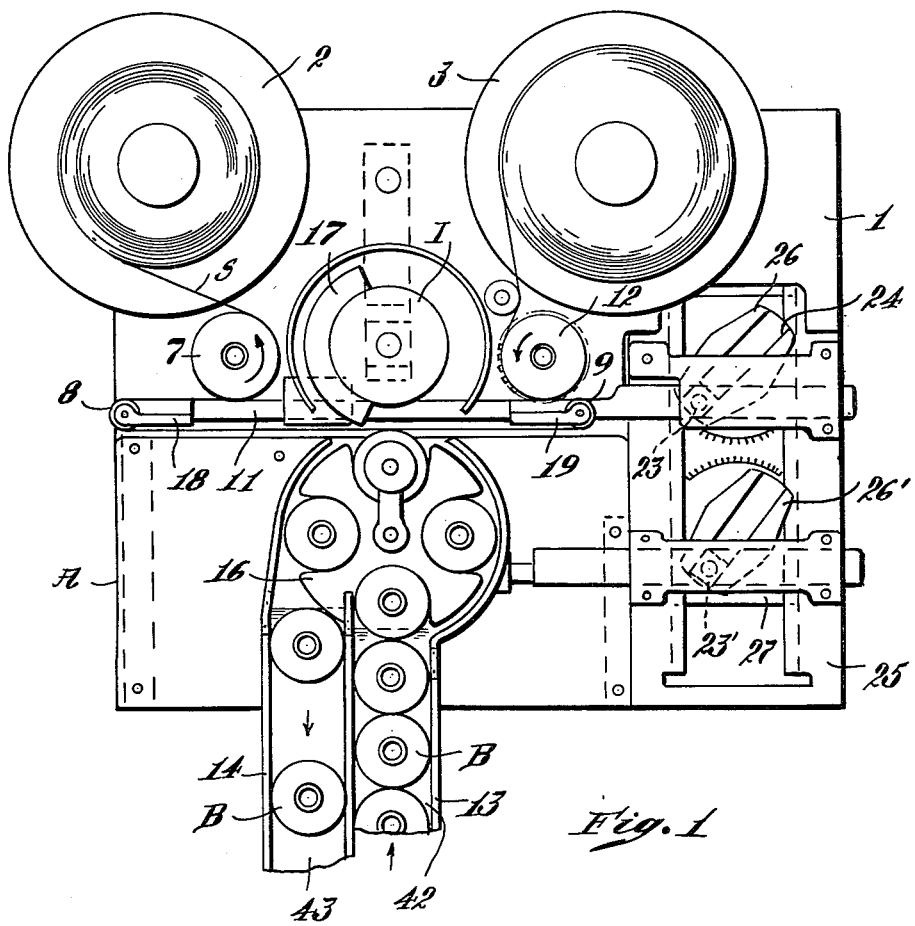
Figure 3:
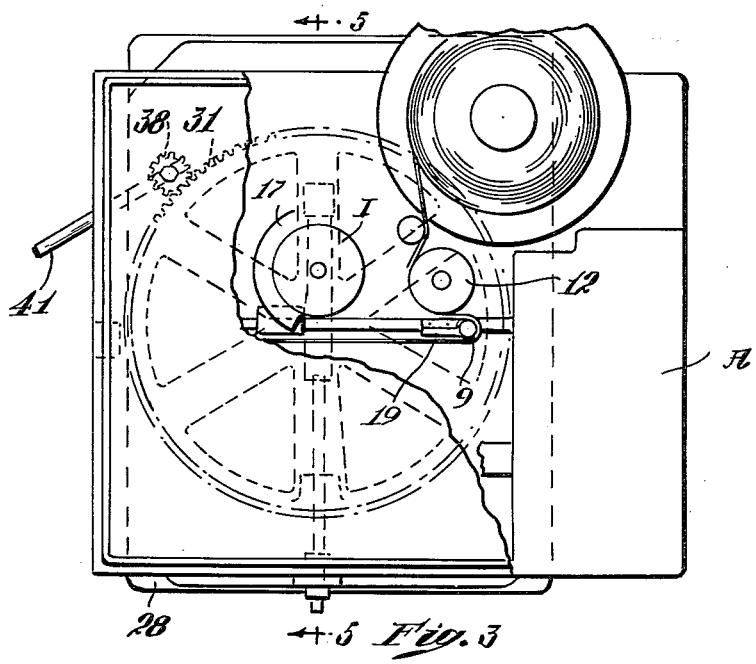
Figure 4:
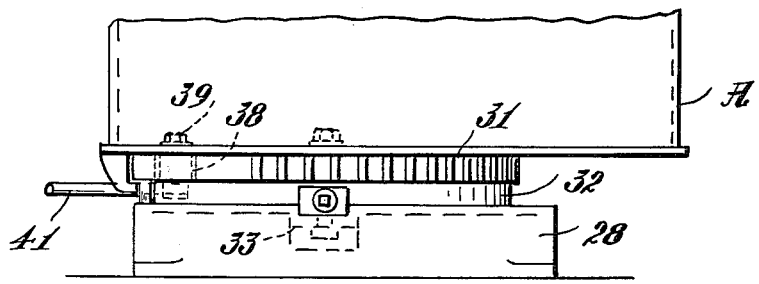
Figure 5:
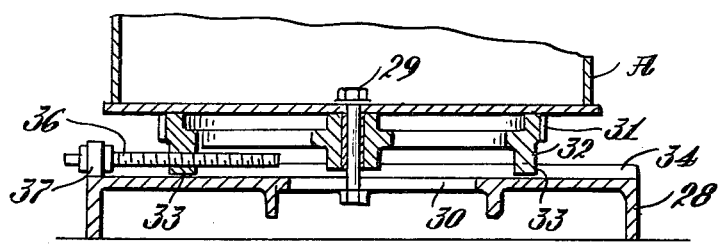
Figure 12:
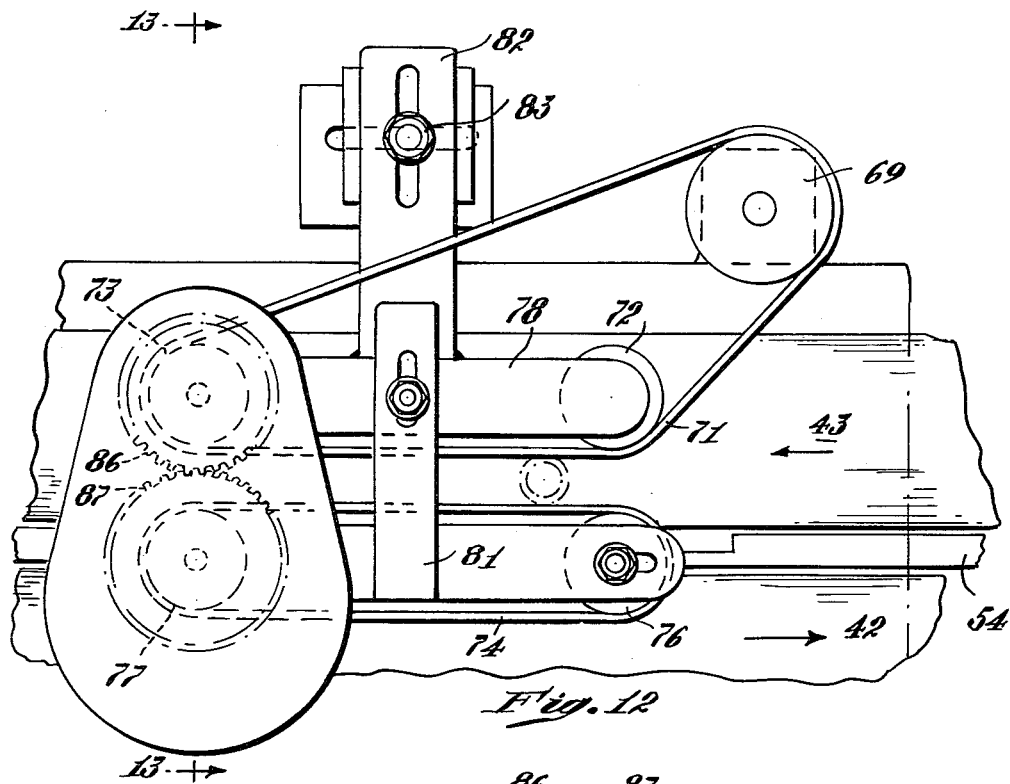
Figure 13:
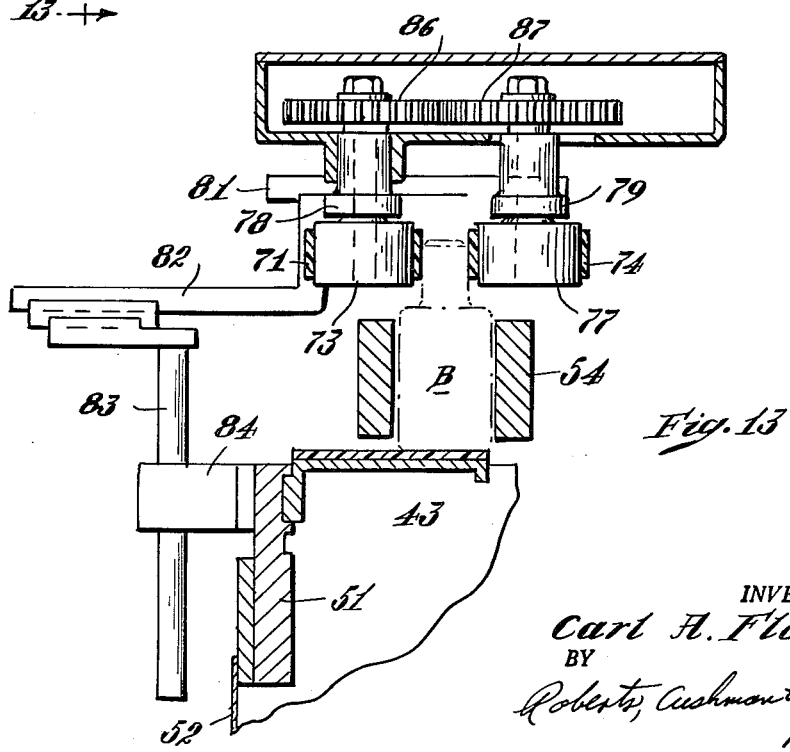

For the purpose of illustration a typical embodiment of the invention is shown in the accompanying drawings in which:

FIG. 1 is a plan view of one label-applying mechanism;
FIG. 2 is a plan view of a label strip used by the label-applying mechanism;
FIG. 3 is another plan view of a label-applying mechanism and means for shifting it to different positions;
FIG. 4 is a side view of FIG. 3;
FIG. 5 is a section on line 5—5 of FIG. 3;
FIG. 6 is a diagrammatic plan view;
FIG. 7 is a section on line 7—7 of FIG. 6;
FIG. 8 is a section on line 8—8 of FIG. 7;
FIG. 9 is a section on line 9—9 of FIG. 7;
FIGS. 10 and 11 are diagrammatic plan views of one label-applying mechanism adjusted to different positions for different kinds of articles;
FIG. 12 is a plan view of the means for turning the articles in transit from one label-applying mechanism to the other; and
FIG. 13 is a section on line 13—13 of FIG. 12.

The particular embodiment chosen for the purpose of illustration involves an applicator A such as shown in FIG. 1 for applying labels L from the label strip S having sprocket holes H such as shown in FIG. 2. As described and claimed in my copending application Ser. No. 729,216, filed April 17, 1958, now U.S. Patent No. 2,981,432, this label-applying mechanism comprises a main frame 1 carrying the mechanism for feeding the label strip S from the feed roll 3 to a take-up reel 2 past a rotary heat-transfer iron I and mechanism for feeding bottles B past the label-applying station on the side of the label strip opposite the iron. The label strip feeds over a sprocket roll 12 which meshes with the perforations in the margin of the label strip and rotates at a constant continuous speed, thence over two rolls 9 and 8 at opposite ends of the reciprocating carriage 11 and thence over an idler roll 7. The bottles B are fed to and from the label-applying station through chutes 13 and 14. At the label-applying station is a turret 16 having peripheral recesses to receive the individual bottles. In the feed chute 13 the bottles are pressed against the turret so that a bottle enters each empty recess as the recess passes the chute and as each bottle reaches the delivery chute 14 it is dischargd through that chute. The bottles are fed to and from the turret 16 by conveyor belts as hereinafter described. The iron I has a raised portion 17 whose circumferential length is preferably equal to the length of each label and the labels are fed to the label-applying station in synchronism with the rotating iron so that the leading edge of the raised portion 17 engages the leading edge of a label and as the two progress in unison the label is pressed against the bottle at the label-applying station, the bottle being rotated in synchronism with the iron.

When the carriage 11 is stationary the label strip S is advanced by the drive roll 12 at a constant continuous speed. However, the advance of the label strip past the label-applying station should be arrested after each bottle has been labeled while the next bottle is being brought into position to be labeled. This is accomplished by moving the carriage back and forth lengthwise of that portion of the path of the label strip extending from roller 8 to roller 9.

As shown in FIG. 1 the carriage 11 carries the rollers 8 and 9 by means of two brackets 18 and 19. Mounted on the rear side of the carriage is a cam follower 23 sliding in a slot 24 on the front side of an adjustable cam 26 which is rotatably mounted in a slide 27 which slides horizontally in a U-shaped guide 25 fast to the frame 1. The bottle turret 16 is actuated by a similar cam block 26' similarly mounted on the lower end of the slide 27 and carrying a similar cam follower 23'.

Inasmuch as the aforesaid mechanism is described and claimed in the aforesaid application, further description is unnecessary for a full understanding of the present invention.

As illustrated in FIG. 6 two of these label applying mechanisms are shown at A and A'. Each label-applying mechanism is pivotally mounted on a base 28 or 28' respectively to swing about a vertical bolt 29, FIG. 5, so that each label-applying mechanism may be turned to various angular positions relative to the base as illustrated in FIGS. 10 and 11. The bolt 29 extends through a slot 30 in the base. As shown in FIGS. 3 to 5 the mechanism for turning each label-applying mechanism may comprise a gear 31 on a circular member 32 interposed between the label-applying mechanism and its base. The intermediate support 32 has depending lugs 33 fitting in a guideway 34 on the base so that support 32 may slide transversely of the base but not rotate relatively to the base. The support 32 may be shifted transversely of the base by means of a screw 36 journalled in a boss 37 on the base and threading through the member 32 (FIG. 5). The label-applying mechanism may be rotated around the bolt 29 which interconnects it with the base 28 and support 32 by means of a pinion 38 rotatably secured to the bottom of the label-applying mechanism by means of a bolt 39 having an opening in its lower end detachably to receive the handle 41 (FIG. 4). By turning the pinion 38 it creeps around the gear 31 thereby rotating the label-applying mechanism about the bolt 29 to various angular positions such as shown in FIGS. 10 and 11.

Leading to each label-applying mechanism is a conveyor belt 42 and leading away from each label-applying mechanism is a conveyor belt 43 (FIGS. 1, 6, 10 and 11). When feeding articles from one label-applying mechanism to the other the belt leading away from one label-applying mechanism is aligned with the belt leading to the other label-applying mechanism so that the articles are fed continuously from one belt to the other, a bridge 44 being interposed between the juxtaposed ends of the two conveyors as indicated in FIG. 6; or the belt leading from label-applying mechanism A may extend all the way to label-applying mechanism A'. The belts are mounted on elongate slides 46 and 47 which have rollers 48 at their opposite ends (FIGS. 7 and 8). The slides have longitudinal ribs 49 on their outer sides which slide in grooves in guideplates 51 mounted on a stand 52 so that the slides may be adjusted toward and from the label-applying mechanisms. Mounted on the sides of the slides by means of brackets 53 are guide rails 54 to form channels for the bottles or other articles.

As shown in FIGS. 7 and 8 the belt 42 is trained over rollers 56, 57 and 58 and the belt 43 is trained over rollers 59, 60 and 61. These rollers are journalled in the stand 52 and the trunnions of rollers 56, 58 and 59 are adjustable along slots 62 in the sides 51 of the stand to adjust the tension of the belts. Rollers 57 and 60 are driven by a motor 63 through a gear box 64, chain 65 and sprocket wheels 66.

Connected to the sprocket wheels 66 through bevel gears 67 is a shaft 68 leading upwardly to a pulley 69 (FIGS. 6, 7, 8 and 12). The pulley 69 drives a belt 71 which is trained around pulleys 72 and 73. A second belt 74 is trained around rollers 76 and 77. These pulleys are journalled in two bars 78 and 79. Bar 79 is mounted on bar 78 by means of a cross arm 81, and bar 78 is supported by a bracket 82 mounted on a post 83 which is vertically adjustable in a bracket 84 secured to the aforesaid part 51 of the stand 52. On the upper ends of the shafts for pulleys 73 and 77 are intermeshing gears 86 and 87 through which the belt 74 is driven.

As shown in FIGS. 12 and 13 the bars 78 and 79 are adjusted so that the belts 71 and 74 bear on the opposite sides of the necks of the bottles B carried by the belt 43 between the guides 54. By making the gear 86 smaller than the gear 87 the belt 71 is driven faster than the belt 74, the difference in speed being adjusted to turn the bottles 180° as they pass between the two belts. Thus the label-applying mechanism A applies a label to one side of each bottle and the label-applying mechanism A' applies a label to the opposite side of the bottle. The bottles may be placed on the belt 42 at any location along the length of the belt but the operator station is preferably near the juxtaposed ends of the belts 42 and 43', as indicated at 0 in FIG. 6, so that the operator may not only place bottles on the belt 42 but may also watch the delivery of bottles from the belt 43' into a suitable receptacle.

As fully disclosed in the aforesaid application Sr. No. 729,216, the label-applying mechanisms may be used to apply labels to articles of different shapes, such as round bottles and oval bottles, and for articles of different shapes the label-applying mechanisms should be oriented differently with respect to the conveyors for carrying the articles to and from the label-applying mechanisms. Thus the label-applying mechanism may be oriented as shown in FIG. 10 for round bottles and as shown in FIG. 11 for oval bottles.

It should be understood that the present disclosure is for the purpose of illustration only and that this invention includes all modifications and equivalents which fall within the scope of the appended claims.

I claim:

1. A machine for labeling articles comprising a label-applying mechanism including an article-carrying turret and a rotary transfer iron operable with respect to articles on the turret, a base for the label-applying mechanism, means for conveying articles to and from the label-applying mechanism along predetermined paths, and means for shifting the label-applying mechanism relatively to said base and said paths to alter the relative direction in which the label-applying mechanism is approached by the articles conveyed thereto, to accommodate articles of different kinds.

2. A machine for labeling articles comprising a label-applying mechanism including an article-carrying turret and a rotary transfer iron operable with respect to articles on the turret, a base for the label-applying mechanism, means for conveying articles to and from the label-applying mechanism along predetermined paths, and means for rotating the label-applying mechanism relatively to said base and said paths to alter the relative direction in which the label-applying mechanism is approached by the articles conveyed thereto, to accommodate articles of different kinds.

3. A machine for labeling articles comprising a label-applying mechanism including an article-carrying turret and a rotary transfer iron operable with respect to articles on the turret, a base for the label-applying mechanism, means for conveying articles to and from the label-applying mechanism along predetermined paths, and means for shifting the label-applying mechanism transversely relatively to said base and said paths to alter the relative direction in which the label-applying mechanism is approached by the articles conveyed thereto, to accommodate articles of different kinds.

4. A machine for labeling articles comprising a label-applying mechanism including an article-carrying turret and a rotary transfer iron operable with respect to articles on the turret, a base for the label-applying mechanism, means for conveying articles to and from the label-applying mechanism along predetermined paths, means for shifting the label-applying mechanism transversely relatively to said base and said paths, and means for rotating the label-applying mechanism relatively to said base and said paths to alter the relative direction in which the label-applying mechanism is approached by the articles conveyed thereto, to accommodate articles of different kinds.

5. A machine for labeling articles on two sides comprising two label-applying mechanisms and an intermediate operator's station, each of said label-applying mechanisms including an article-carrying turret and a rotary transfer iron operable with relation to articles on the turret, a base for each label-applying mechanism, means for conveying articles to one of said label-applying mechanisms along a predetermined straight path, thence to the other label-applying mechanism along a straight path parallel to said path, and then back to said station along a path parallel to said paths, and means for shifting each of said label-applying mechanisms relatively to its base and said paths to alter the relative direction in which the label-applying mechanism is approached by the articles conveyed thereto, to accommodate articles of different kinds.

References Cited in the file of this patent

UNITED STATES PATENTS

| | | |
|---|---|---|
| 1,246,006 | Stake | Nov. 6, 1917 |
| 1,272,670 | Johnson et al. | July 16, 1918 |
| 2,173,892 | Von Hofe et al. | Sept. 26, 1939 |
| 2,359,433 | McNamara | Oct. 3, 1944 |
| 2,703,660 | Von Hofe et al. | Mar. 8, 1955 |
| 2,981,432 | Flood | Apr. 25, 1961 |